United States Patent [19]
Prysner

[11] Patent Number: 5,208,891
[45] Date of Patent: May 4, 1993

[54] FIBER-OPTIC VIEWGRAPH PROJECTOR

[75] Inventor: William J. Prysner, Gales Ferry, Conn.

[73] Assignee: The United State of America as represented by the Secretary of the Navy, Washington, D.C.

[21] Appl. No.: 772,185

[22] Filed: Oct. 7, 1991

[51] Int. Cl.$^5$ .......................... G02B 6/06; G02B 6/32; G03B 17/02; G03B 21/26

[52] U.S. Cl. ....................................... 385/116; 385/33; 385/100; 385/119; 385/901; 359/443; 359/448; 359/649; 353/35; 352/129; 352/198; 352/242

[58] Field of Search ................. 385/33, 100, 115, 116, 385/119, 147; 359/443, 448, 649; 353/28, 35, 52, 122; 352/27, 129, 242, 198; 40/546, 547

[56] References Cited

U.S. PATENT DOCUMENTS

| | | | |
|---|---|---|---|
| 3,815,986 | 6/1974 | Darbee | 385/901 X |
| 4,170,400 | 10/1979 | Bach et al. | 385/119 |
| 4,620,266 | 10/1986 | Baumann et al. | 362/32 |
| 4,917,487 | 4/1990 | Cruickshank | 353/28 |
| 5,031,990 | 7/1991 | Mori | 385/901 X |
| 5,076,660 | 12/1991 | Messinger | 385/119 |
| 5,136,675 | 8/1992 | Hodson | 385/147 X |
| 5,150,443 | 9/1992 | Toyoda et al. | 385/901 X |
| 5,165,187 | 11/1992 | Shahidi-Hamedani et al. | 385/901 X |

FOREIGN PATENT DOCUMENTS 2073905 10/1981 United Kingdom ........... 385/116 X

*Primary Examiner*—Brian Healy
*Attorney, Agent, or Firm*—Michael J. McGowan; Prithvi C. Lall; Michael F. Oglo

[57] ABSTRACT

A viewgraph projector having a light above the transparency receiver and projecting downward through the transparency is provided. The projected image is received below the transparency by a condenser lens and further transmitted by a flexible fiber-optic cable. A projecting lens is provided at the output end of the fiber-optic cable for projecting the images to a screen. Structurally associated with the projecting lens is a device or means which enables removably affixing the projecting lens relative to a suitable support in a conference room environment, which device may for example constitute a clip, hooking means, clamp, or weights. This enables a subset of the aforesaid elements comprising the light source, transparency receiver, and condenser lens to be located independently of the projecting lens, as for example, to locations where they do not obstruct the audience's field of view or where backscattered illumination from the light source does not annoy the audience. A three-sided wall extends downward from the level of the light to the transparency receiver reducing external illumination and providing intrinsic convective cooling of the light.

5 Claims, 1 Drawing Sheet

FIBER-OPTIC VIEWGRAPH PROJECTOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The field of the invention is viewgraph projectors and in particular image projection using fiber-optic bundles.

(2) Description of the Prior Art

Viewgraph projectors are typically configured with a light source and mirror assembly contained in a projection box. The light source leaves the projection box vertically upward through a glass window on which a transparency is located. The image generated is directed upward to a focusing lens and mirror assembly held in position by an extension arm. This assembly turns the projection beam horizontally and directs a focused image onto a display screen. Because of the glass top on the projection box, natural convective cooling is impeded. Additionally, the location of the transparency above the light source on the glass surface has a stove top effect. As a result, the projection box requires a large and noisy cooling fan and other electrical and structural parts.

The changing of viewgraph transparencies requires the speaker to be located at the projector box. The design thereby places the projector, the extended arm, the focusing lens and mirror assembly, and the speaker himself, all in the direct line of viewing of the audience, creating a major obstruction to viewing, and, because of the cooling fan, creating a major impediment to hearing.

Work around methods, such as using a second seated operator to change viewgraphs, are undesirable since they limit the speaker's use of pointers or other direct control of the viewgraphs. Additionally, the structure of the projector itself remains in the direct line of view of the audience.

In order to move the projector and speaker out of the line of view of the audience, it is necessary to provide a means of transmitting the projected images from a side-located projector to the required projection point. It is well known in the art that optical images may be transmitted by fiber-optic bundles. Commercially available coherent bundles are now suitable for image projection.

SUMMARY OF THE INVENTION

It is an object of the invention to provide a viewgraph projector which can be located to the side of the viewing field.

It is another object of the invention to provide a viewgraph projector having a small projection lens located in the center of the viewing field.

It is a further object of the invention to provide a viewgraph projector having a downward directed source light.

It is yet another object of the present invention to provide a viewgraph projector having a low noise level.

It is still another object of the present invention to provide a viewgraph projector having natural convective cooling.

The invention is a viewgraph projector having a downward directed light source. The projector uses a condenser lens to direct the generated image to a multi-fiber coherent optical cable. The image is transmitted along the cable to the desired projection location where a projection lens focuses the image on a screen.

DESCRIPTION OF THE PREFERRED EMBODIMENTS

Figure 1:
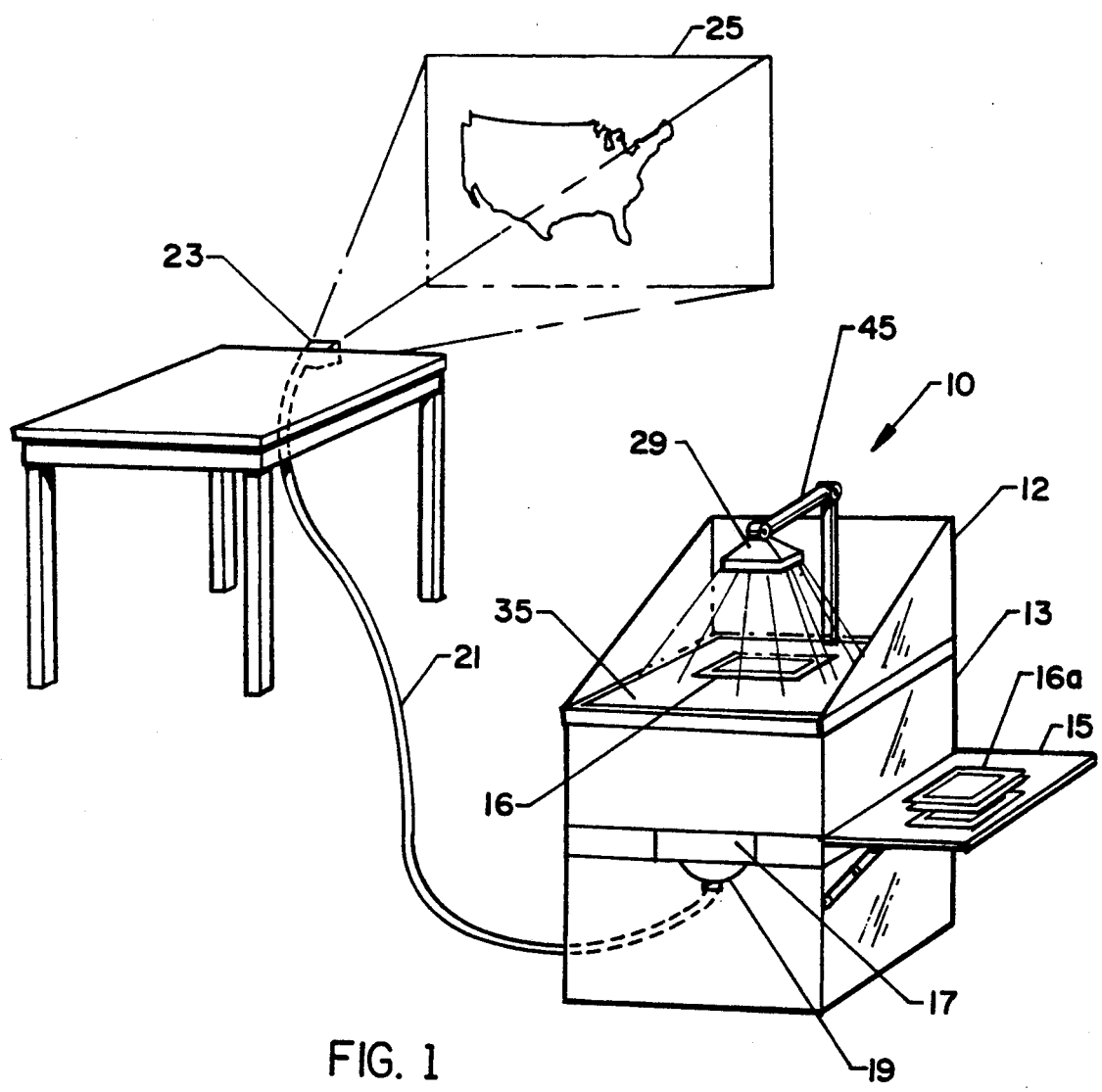
FIG. 1 perspective view of the fiber-optic viewgraph projector assembly of the invention.

Referring now to FIG. 1, a table mount viewgraph projector of the present invention, designated generally by the reference numeral 10, is shown with its major components as a representative structure for supporting the projector components. The viewgraph projector housing 12 and lens framework 13 carry a high intensity lamp 29 directed downwardly from an adjustable arm 45. Tray 15 supports transparency slides 16a when not positioned on glass surface 35 over a lens assembly 17. The transparency slide 16 for instant projection is placed above lens assembly 17 containing the condenser lens 19. Condenser lens 19 directs the image to fiber-optic cable 21 which in turn, transmits the formed image to projection lens 23 where the image is then projected onto screen 25.

The high intensity lamp 29 is configured such that all light energy is directed downward and focused on the transparency slide 16. The lamp is mounted on a vertically adjustable arm 45 for focusing. Stray light is eliminated. The addition of a lamp/light shade can further reduce unnecessary side illumination. Three sides of the housing 12 and lens framework 13, starting at an elevation below the high intensity lamp 29, are partially enclosed to reduce illumination of the viewing room. The fourth side is open to facilitate easy placement of transparency slide 16 on glass surface 35. Transparency slide 16 is placed on the glass surface 35 over lens assembly 17 and condenser lens 19. This entire assembly directs the image to the fiber-optic cable 21. By any suitable means condenser lens 19 is made an adjustable focusing lens (this feature not shown in the drawing).

The arrangement of the light source and housing provides natural convective cooling sufficient to eliminate the requirement for a cooling fan. Also, the transparency itself is located away from the heat source and in a relatively cool area. This location greatly reduces the temperature of the transparency again eliminating the requirement for a fan. Since the glass and slide are below the light source, restrictions in upward airflow at the light source is eliminated. It is to be appreciated that this three-sided wall arrangement provides intrinsic convective cooling sufficient to eliminate the fan.

Hinged tray 15 for holding transparencies is optional, since this viewgraph projector can be set-up on a table with the need for a tray being eliminated.

Figure 2:
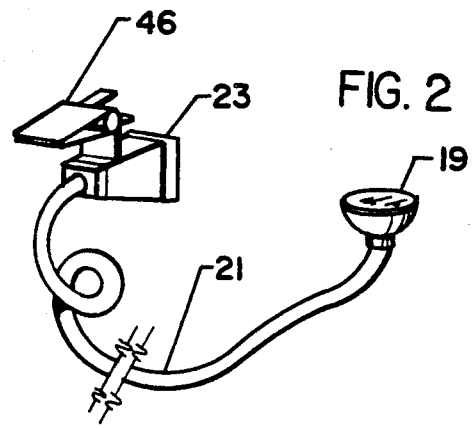
FIG. 2 is a perspective view of the condenser lens, fiberoptic cable, and projection lens components of the projection assembly of FIG. 1.

Referring now to FIG. 2, the condenser lens 19, fiber-optic cable 21 and projection lens 23 are shown. The projection lens 23 may be weighted, hooked, clamped or clipped to a table top or any desired support. Shown here is a clip 46 for slide-on attachment to a conference table. The flexibility of fiber-optic cable 21 permits the speaker and viewgraph projector to be located to the side or rear of the table as desired. Backscatter illumination is again minimized by the design and location of the projection lens.

The advantages of the present invention are numerous. The design provides overhead projection without obstructing the field of view of the audience, yet it continues to allow speaker control of the transparencies.

Further, the design removes both the transparencies and the glass from a position over the light source. As a result, the transparencies are much cooler, and ventilation to the light source is greatly improved. Further, since the backscatter illumination is reduced, the light source can be less intense then a conventional design, thereby further reducing the thermal load. Because of the reduced thermal load, no cooling fan is required and that source of noise is eliminated.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fiber-optic viewgraph projector comprising:
   means for mounting projector components including a vertical stand suitable for locating components in a stacked configuration;
   a light source attached to said mounting means, the construction and arrangement being such that intrinsic convective cooling of the light source is provided;
   a transparency receiver and condenser lens assembly attached to said mounting means and receiving projection light from said light source;
   a fiber-optic cable attached on a first end to said transparency receiver and lens assembly; and
   a projecting lens attached to a second end of said fiberoptic cable, and having a means by which it may be removably affixed in position relative to suitable structures in a conference room environment.

2. A fiber-optic viewgraph projector comprising:
   means for mounting projector components said means forming a three-sided wall arrangement for partially enclosing a quadrilateral space in which the light source is located with a fourth side open to receive transparency slides;
   a light source attached to said mounting means, the construction and arrangement being such that intrinsic convective cooling of the light source is provided;
   a transparency receiver and condenser lens assembly attached to said mounting means and receiving projection light from said light source;
   a fiber-optic cable attached on a first end to said transparency receiver and lens assembly; and
   a projecting lens attached to a second end of said fiberoptic cable, and having a means by which it may be removably affixed in position relative to suitable structures in a conference room environment.

3. A light source as in claim 2 wherein said lamp is directed vertically downward.

4. A fiber-optic viewgraph projector comprising:
   means for mounting projector components;
   a light source attached to said mounting means, the construction and arrangement being such that intrinsic convective cooling of the light source is provided;
   a transparency receiver and condenser lens assembly attached to said mounting means and receiving projection light from said light source, said transparency receiver and lens assembly comprising an enclosure housing having a glass upper surface suitable for receiving transparencies and a condenser lens located vertically below said transparency glass;
   a fiber-optic cable attached on a first end to said transparency receiver and lens assembly; and
   a projecting lens attached to a second end of said fiberoptic cable, and having a means by which it may be removably affixed in position relative to suitable structures in a conference room environment.

5. A transparency receiver and lens assembly as in claim 4 wherein said condenser lens is an adjustable focusing lens.

* * * * *